US008529842B2

United States Patent
Brück

(10) Patent No.: US 8,529,842 B2
(45) Date of Patent: Sep. 10, 2013

(54) CERAMIC HONEYCOMB BODY AND METHOD FOR PRODUCING THE SAME

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 1059 days.

(21) Appl. No.: 12/145,000

(22) Filed: Jun. 24, 2008

(65) Prior Publication Data

US 2008/0307880 A1    Dec. 18, 2008

Related U.S. Application Data

(63) Continuation-in-part of application No. 09/998,724, filed on Nov. 30, 2001, now abandoned, which is a continuation of application No. PCT/EP00/04639, filed on May 22, 2000.

(30) Foreign Application Priority Data

May 31, 1999 (DE) .................................. 199 24 861

(51) Int. Cl.
*B01D 50/00* (2006.01)
(52) U.S. Cl.
USPC .......................................... 422/174; 422/180
(58) Field of Classification Search
USPC .......................................... 422/174, 177, 180
See application file for complete search history.

(56) References Cited

U.S. PATENT DOCUMENTS

| | | | | |
|---|---|---|---|---|
| 3,927,300 A | * | 12/1975 | Wada et al. | 392/502 |
| 4,232,214 A | * | 11/1980 | Shioi et al. | 219/541 |
| 4,448,833 A | | 5/1984 | Yamaguchi et al. | |
| 5,474,746 A | | 12/1995 | Maus et al. | |
| 5,714,103 A | | 2/1998 | Bauer et al. | |

FOREIGN PATENT DOCUMENTS

| | | |
|---|---|---|
| EP | 0627983 B1 | 10/1996 |
| JP | 57209875 A | 12/1982 |
| JP | 1022446 B | 4/1989 |
| JP | 4502880 A | 5/1992 |
| JP | 4193781 A | 7/1992 |
| JP | 4301402 A | 10/1992 |
| JP | 6506153 A | 7/1994 |
| JP | 7504254 A | 5/1995 |
| JP | 7507013 A | 8/1995 |
| JP | 8188478 A | 7/1996 |
| WO | 9101178 A1 | 2/1991 |
| WO | 9316865 A1 | 9/1993 |
| WO | 9321430 A1 | 10/1993 |

OTHER PUBLICATIONS

Japanese Office Action dated Jan. 5, 2010.

* cited by examiner

*Primary Examiner* — Tom Duong
(74) *Attorney, Agent, or Firm* — Laurence A. Greenberg; Werner H. Stemer; Ralph E. Locher

(57) ABSTRACT

A honeycomb body includes ceramic walls all being entirely formed of printed layers forming channels through which a fluid can flow. The channels lie next to one another. At least one of at least one measuring sensor or electrically conductive mass forms a monolithic, unitary structure with one of the ceramic walls. Sensor material may be used as an alternative to ceramic material. A method of producing the honeycomb body is also provided.

42 Claims, 2 Drawing Sheets

CERAMIC HONEYCOMB BODY AND METHOD FOR PRODUCING THE SAME

CROSS-REFERENCE TO RELATED APPLICATIONS

This application is a Continuation-In-Part of U.S. application Ser. No. 09/998,724, filed Nov. 30, 2001, which was a continuation, under 35 U.S.C. §120, of co-pending International Application No. PCT/EP00/04639, filed May 22, 2000, which designated the United States; this application also claims the priority, under 35 U.S.C. §119, of German Patent Application DE 199 24 861.3, filed May 31, 1999; the prior applications are herewith incorporated by reference in their entirety.

BACKGROUND OF THE INVENTION

Field of the Invention

The present invention relates to a honeycomb body with channels through which a fluid can flow and which are disposed so as to lie next to one another. The honeycomb body has walls which form channels and are composed of ceramic. A method for producing a honeycomb body with channels is also provided, in which the honeycomb body is composed in layers.

It is known that honeycomb bodies are produced from ceramic through the use of extrusion methods, wherein the shape of the honeycomb bodies depends on the mask which is used when a green product is being produced. Ceramic honeycomb bodies of that type have regular contours of the channel walls passing through the honeycomb body, as a result of the production method.

BRIEF SUMMARY OF THE INVENTION

It is accordingly an object of the invention to provide a ceramic honeycomb body and a method for producing the same, which overcome the hereinafore-mentioned disadvantages of the heretofore-known methods and products of this general type and with which the application range and the possibility for use of a honeycomb body having ceramic walls are increased.

With the foregoing and other objects in view there is provided, in accordance with the invention, a method for producing a honeycomb body with channels and layers. The method comprises repeating the following sequence of steps: producing a layer with a first plastically deformable and subsequently consolidatable mass; consolidating the layer; and providing a measuring sensor and/or a heater by applying a second electrically conductive mass and/or inserting an electrically conductive body into the honeycomb body.

With the objects of the invention in view, there is also provided a method for producing a honeycomb body with channels and layers. The method comprises repeating the following sequence of steps: producing a layer with a plastically deformable and subsequently consolidatable mass; consolidating the layer; forming walls defining the channels through which a fluid can flow; and providing one of the walls with at least one structure for influencing the fluid.

In accordance with another mode of the invention, the method comprises partially interrupting the layered composition for forming a wall, in order to produce an orifice in the wall as a passage for the fluid from a first channel to a second channel.

With the objects of the invention in view, there is additionally provided a honeycomb body, comprising ceramic walls forming channels through which a fluid can flow. The channels lie next to one another. At least one measuring sensor and/or an electrically conductive mass is integrated into one of the ceramic walls.

In accordance with another feature of the invention, the measuring sensor and/or the electrically conductive mass is integrated into a wall of the honeycomb body which coforms a channel. On one hand, temperatures of the fluid flowing through can be recorded, if the measuring sensor is a temperature sensor and, on the other hand, the honeycomb body itself can serve as a heating device for the fluid. In order to protect the measuring sensor and/or the electrically conductive mass, they may be surrounded completely by ceramic, so that even an aggressive fluid can flow through the honeycomb body, without any intended intercalations suffering damage such as, for example, due to hot gas corrosion or other chemical reactions.

With the objects of the invention in view, there is furthermore provided a honeycomb body, comprising at least partially ceramic walls forming channels through which a fluid can flow. The channels lie next to one another. At least one of the walls has a structure for influencing a throughflow of the fluid.

In accordance with a further feature of the invention, the structure is disposed longitudinally, transversely and/or obliquely to a direction of the throughflow of the fluid through the channel. In particular, the structure may be wavy or zigzag-shaped.

With the objects of the invention in view, there is also provided a honeycomb body, comprising channels through which a fluid can flow. A plastically deformable and subsequently consolidatable first mass is in particular formed in layers and predeterminably applied and consolidated. At least one second mass forms a layer along a section through the honeycomb body next to the first mass. The first mass has a property different from that of the second mass.

The features of the respective honeycomb bodies may also be combined with one another. Advantageously, the structures are capable of being disposed in such a way that they assist functions of intercalations in the honeycomb body, whether they be, for example, temperature measurement or heating of the fluid. The respective masses used for the honeycomb body are also selected and disposed accordingly.

One possible way of producing a honeycomb body, as illustrated above, may be gathered from the following description: a honeycomb body with channels formed of a pore structure predeterminable in a pattern-like manner, is produced from a plastically deformable and subsequently consolidatable first mass. The first mass is disposed in layers, predeterminably applied and consolidated and has, in addition to the first mass, at least one second mass which forms a predetermined layer in the honeycomb body. A method for producing a honeycomb body of that type having a pore structure predeterminable in a pattern-like manner may be gathered from European Patent EP 0 627 983 B1, corresponding to U.S. Pat. No. 5,714,103, the full content of the relevant features of which are incorporated herein by reference. Utilizing a second mass in addition to the first mass has the advantage of permitting different properties to be assigned to the respective masses. This means, with regard to the honeycomb body, that it is in one piece, but can nevertheless have different regions with different properties.

In accordance with an added feature of the invention, the first mass is electrically nonconductive and the second mass is electrically conductive. It thereby becomes possible for a honeycomb body to be produced which, for example, allows electrical current to flow through in some portions of its wall, whereas other regions of the wall remain cool. This makes it possible for the honeycomb body to also be divided into various active regions. A first portion serves, for example, as a heating device, a subsequent second portion as an adsorber and a third portion as a catalyst. These portions, which are listed merely by way of example, may also be interchanged or combined with one another.

The use of at least one first and one second mass also makes it possible for the second mass to be embedded at least partially in the first mass, or the converse may be the case. With regard to a possible electrical conductivity of the second mass, there is therefore the possibility of causing electrical conductor tracks to run in the honeycomb body in such a way that they run within a wall of the honeycomb body. Contact between these conductor tracks and the throughflowing fluid as a result of the honeycomb body can be avoided in this way. On the other hand, the use of a suitable first or second mass and the associated possible setting of a desired porosity of the honeycomb body at a particular point make it possible for the fluid to impinge directly onto the electrical conductor track. For example, a chemical property or composition of the fluid flowing through can be tested in this way. The production method also makes it possible for the honeycomb body to be composed in such a way that a carrying structure of the honeycomb body is composed of the first mass, while the second mass is disposed as a layer, for example a catalyst material or adsorber material, in each case at the edges of this carrying structure.

In accordance with an additional feature of the invention, there is provided a body to be integrated into the honeycomb body. For this purpose, the body can be added to the predetermined location during the layered composition and embedded, if not even surrounded, during the further layered composition of the honeycomb body by the mass being used. This is suitable particularly for integrating a measuring sensor into the honeycomb body. Either the measuring sensor is prefabricated and surrounded in layers during the production of the honeycomb body or else the measuring sensor is composed, likewise in layers, simultaneously with the production of the honeycomb body, and corresponding masses are used which ultimately yield the measuring sensor. In addition to a measuring sensor, a resistance wire, a resistance layer or another body can also be integrated, in particular as an intercalation, into the honeycomb body in this way.

In accordance with yet another feature of the invention, there is provided a honeycomb body with channels, which is produced from a plastically deformable and subsequently consolidatable first mass. The first mass is disposed in layers, predeterminably applied and subsequently consolidated. The honeycomb body has a main direction of throughflow along a shortest path. A plurality of layers then form a predetermined structure at an exactly defined location of the honeycomb body. The structure precalculably prolongs a flow path in a channel along the main direction of throughflow with respect to a shortest path. The use of the method referred to above makes it possible to ensure that, before being produced, the exact honeycomb body can be calculated fluidically with extremely high accuracy according to its main field of use, and associated parameters are subjected to a flow-optimized rating which covers as wide a region as possible of the operating range of the honeycomb body. The intended prolongation of the main direction of throughflow can therefore be fixed beforehand in such a way that it can also be implemented later in the honeycomb body itself, within the channels, at the intended location. In particular, it thereby becomes possible to achieve a computationally predetermined desired turbulence in the honeycomb body itself for the set operating point.

In accordance with yet a further feature of the invention, the structure may be disposed in such a way that it generates a desired, in particular precalculated turbulence and/or diffusion in a channel. Furthermore, the structure may have an interruption in the layers, thus leading to cavities or channel cut-throughs. In this way, channels, which would otherwise be closed relative to one another in the honeycomb body, can be connected to one another in the honeycomb body at exactly locally defined points, in order to thereby form, for example, in the honeycomb body itself a prolonged path for the fluid flowing through. Moreover, the shortest path along a main direction of throughflow of the honeycomb body is intended to mean the shortest distance between an inlet and an outlet of the honeycomb body. This may run along a longitudinal axis through the honeycomb body or, in the case of a radial throughflow, along a radius through the honeycomb body. Structures and flow angles can then be disposed and composed inside the honeycomb body in a completely freely predeterminable and precalculable way.

In accordance with yet an added feature of the invention, the structure and/or the channel is at least partially permeable due to the setting of a porosity of the first mass. This makes it possible for a fluid to penetrate at least partially into the structure or the channel up to a particular depth of the first mass. It is only where the porosity becomes so closely packed as to cause the fluid to be deflected again because of the high throughflow resistance that is it diverted or led further along predetermined paths within the honeycomb body.

In accordance with a concomitant feature of the invention, a predeterminable structure is provided in or on a channel at a predeterminable location in a honeycomb body as a result of the composition of a plurality of layers, the structure and location having been defined beforehand through the use of a turbulence calculation. Advantageously, this turbulence calculation also includes a calculation of the chemical reactions that are necessary later, for example when the honeycomb body is used as a catalytic converter or an adsorber. In particular, a honeycomb body, as was described above, can be provided through the use of this method.

Additional developments are obtained as a result of suitable combinations with one another of the features disclosed above and below, relating to the honeycomb bodies and to the method.

Other features which are considered as characteristic for the invention are set forth in the appended claims.

Although the invention is illustrated and described herein as embodied in a ceramic honeycomb body and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
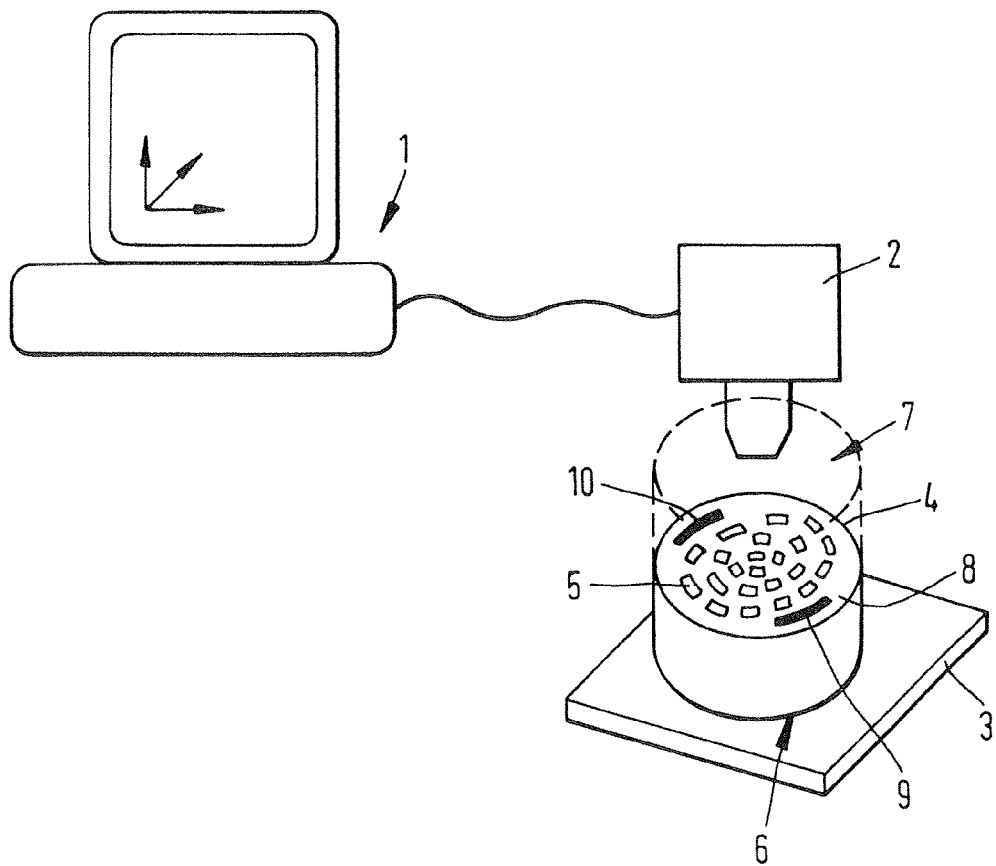
FIG. 1 is a diagrammatic, partly elevational and partly perspective view illustrating a production method for a honeycomb body.

Referring now to the figures of the drawings in detail and first, particularly, to FIG. 1 thereof, there is seen a diagrammatic view illustrating a method for producing a honeycomb body. Reference is also made, within the scope of the disclosure, to European Patent EP 0 627 983 B1, corresponding to U.S. Pat. No. 5,714,103, with regard to the method as well as to further features, in particular materials being used and their properties. All necessary calculations can be carried out on a computer installation 1 before production of the honeycomb body. In particular, turbulence calculations as well as chemical reaction calculations, along with heat calculations and stability calculations, while taking operating ranges of the honeycomb body into account, make it possible to have the capability of fixing an optimum configuration of the honeycomb body. The layout, which is calculated in this way by making use of structures, for example, is then transferred into a corresponding suitable manufacturing machine 2, for example simultaneously, by the computer installation 1. The manufacturing machine 2 travels correspondingly over a manufacturing table 3, for example through the use of a coordinate system which is shown. At the same time, precalculated layers and structures are formed and consolidated, strengthened or hardened. A honeycomb body 4 is illustrated in the process of being formed, on the manufacturing table 3. Channels 5 run along the longitudinal axis through the honeycomb body 4. A first side 6 of the honeycomb body 4 defines an entrance for a fluid subsequently flowing through the honeycomb body 4, while a second side 7, that is not yet finished, defines a corresponding exit for the fluid. A first body 9 and a second body 10, which are integrated into the honeycomb body during further finishing thereof, are intercalated or inserted into walls 8 of the honeycomb body 4. As is illustrated, the two bodies 9, 10 are inserted at intended points during manufacture. This is also possible in inner walls 8 of the honeycomb body 4. In addition to the composition of cross-sectional disks, it is also possible, in the case of appropriate consolidation, to construct the honeycomb body 4 horizontally, for example with the aid of a corresponding mold, in which the honeycomb body is made. This type of manufacture is appropriate particularly when long bodies are to be intercalated or inserted and integrated into the honeycomb body 4.

Figure 2:
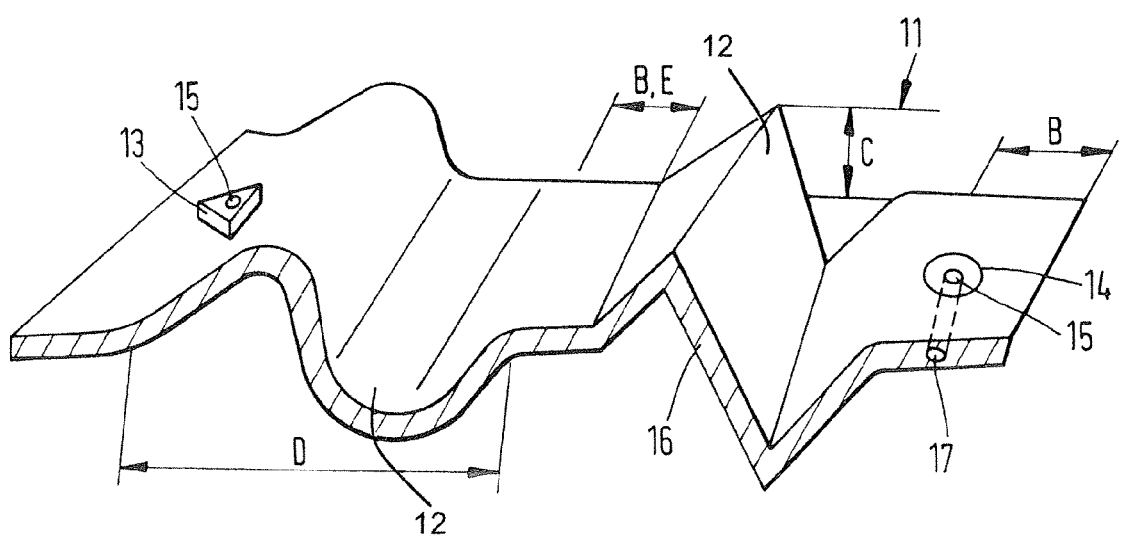
FIG. 2 is an enlarged, perspective view of a structure which can be provided, for example, as a longitudinal or transverse structure in a honeycomb body.

FIG. 2 shows a first channel wall 11 which is structured. In addition to straight smooth portions B, there are corrugations 12 having an amplitude C or wavelength D which can be freely determined and produced according to requirements. Distances between the corrugations, identified herein by reference symbol E, can also be produced individually for the intended use of the honeycomb body, without regard to a manufacturing tool. The channel wall 11, which has a cross section that is illustrated herein, may have a structure which is a longitudinal or transverse structure relative to the main direction of throughflow as well as a mixture between a pure transverse or longitudinal structure. In addition to the actual structure, the channel wall also has a further structure which is in the form of a first elevation 13 and a second elevation 14 and which is disposed in the flow path in order to generate turbulence. The shape of the structure can be configured freely, depending on its respective intended use. Thus, the first and/or second elevation 13, 14 may have a measuring sensor 15 inside them which consequently projects into the fluid stream. While the measuring sensor 15 is in direct contact with the fluid stream at the first elevation 13, the measuring sensor 15 in the second elevation 14 is completely surrounded by material of the second elevation 14 and is therefore shielded against the fluid flowing through. A configuration of a second mass 17 which is integrated in a first mass 16 of the channel wall 11 and which is electrically conductive and transmits signals from the measuring sensor 15 through the honeycomb body 4, is also apparent.

The wall of the honeycomb body is formed with a multiplicity of layers built up from ceramic material or alternatively from sensor material, in particular in such a way that a desired continuous shape of the wall is maintained. Thus, the wall of the honeycomb body and the sensor or mass together form a monolithic, unitary or one-piece structure in which the sensor and the wall are merged and unified into a whole.

This structure is distinguished from the layered structures of the prior art in which a sensor is merely placed into a void between two separate layers of the material, which forms the honeycomb body, and those layers are bent to conform to the shape of the sensor, but no monolithic, unitary or one-piece structure is formed.

A PTC (Positive Temperature Coefficient) material, which may be ceramic material, can be used for the sensor material. Thermistors or ceramic elements used for temperature sensors may also be incorporated as part or all of the walls. Other electrically conductive materials, such as materials in which metal is incorporated in ceramic, may also be used. Such materials, like PTC materials, experience a resistance change due to a change in temperature.

Sensors, such as metallic material in ceramic, may also be placed in parts of the wall, for example in an inner or central part, and lead radially outwardly along a path to a connecting point at an outer part or casing of the honeycomb body. The sensors, or regions with both metal and ceramic, may also be positioned only in inlet and/or outlet sides of the honeycomb body. For example, only the walls bordering or near several channels, for instance less than 10% of the channels, may have both metal and ceramic materials, thus providing sensors.

Figure 3:
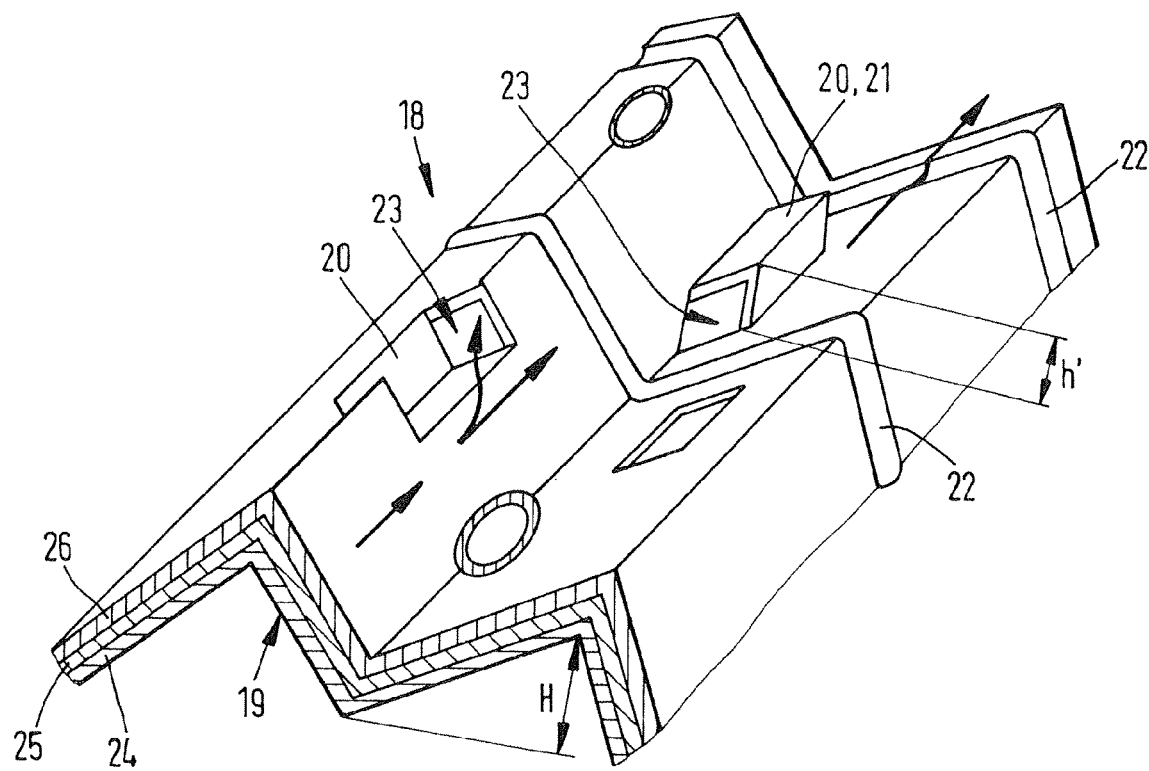
FIG. 3 is a perspective view of a further structure which can likewise be produced through the use of one of the methods of the present invention.

FIG. 3 shows a second channel wall 18, which again is structured. A first structure 19 in the form of an open triangular serration, has interruptions in layers of which the second channel wall 19 is composed. A production method which uses a plastically deformable and subsequently consolidatable mass makes it possible to provide a further second structure 20 as a microstructure in the first structure 19. The second structure 20 is disposed, for example as an indentation or protuberance in the first structure 19, as a longitudinal structure 21 and a transverse structure 22. The longitudinal structure 21 has an orifice 23, so as to serve as a passage from one channel into an adjacent channel. In particular, the layered composition of the second channel wall 18 makes it possible for both a first height H of the open triangle and a second height h' of the second structure 20 to be freely adjustable according to requirements. The same also applies to the respective thickness of the channel wall 18 which, in this exemplary embodiment, is composed of a first layer 24, a second layer 25 and a third layer 26. The first layer 24 and the third layer 26 are produced from a first mass, while the second layer 25, which is embedded between the other two, is formed of a second mass which is electrically conductive. It thereby becomes possible for the channel wall 18 to be fully heated, in order to thereby heat up a fluid flowing through, as is indicated by arrows.

During the formation of orifices and of other structures being interrupted in the direction of the layered composition, it must, of course, be remembered that a layer cannot be composed without a base. Consequently, either auxiliary structures must be used instead of the later orifices (for example, made from a material which is later burnt or melted away) or the edges of the orifices must run obliquely, so that a layered composition provided through the use of laterally projecting layers is possible.

The consolidation of the first and the second mass makes it possible for geometries and consequently structures to be freely formed. In particular, ceramic raw materials, as well as metallic raw materials, which may also be connected to one another, come under consideration as materials for the first and second mass. Examples of ceramic raw materials which may be mentioned are oxide ceramics as well as metal ceramics, as well as metallic raw materials, metal powder, metal oxides or metal solutions, as have also already become known individually heretofore for honeycomb bodies to be sintered. However, these can now be connected to one another by being applied together or being intermixed, in each case in individual layers. The former may also be gathered, for example, from the following description of FIG. 4.

Figure 4:
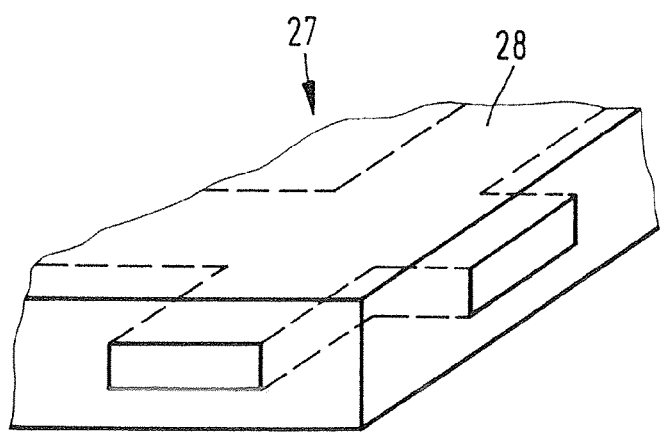
FIG. 4 is a fragmentary, perspective view of a layered composition of the honeycomb body, into which a body is integrated.

FIG. 4 shows a third body 28 integrated into a third channel wall 27. The integration of the third body 28 into the third channel wall 27 was carried out in such a way that, initially, a first mass was applied and consolidated in layers. After a particular layer height was reached, a second mass was also used in the composition of the subsequent layers. After a height of the second mass that was satisfactory for the intended use was reached, once again only the first mass was used for the further layers. It becomes possible in this way for the second mass to be surrounded completely by the first mass and consequently to be embedded and integrated in the latter. The second mass forms a cross in this case, such as could be necessary, for example, for a distributor of an electrical current within a honeycomb body. Highly diverse conductor tracks or the like can be produced through the use of an appropriate distribution of the second mass during the production of the honeycomb body to compose the layers of the latter. Cavities can also be implemented in the honeycomb body produced in layers in this way and, because of the nature of the method being used, very fine channels of between 15 and 50 micrometers can be formed as channel structures in the honeycomb body. In particular, the method makes it possible for individual layer heights of about 1.5 to 4 micrometers up to more than 100 micrometers to be composed. This means, in turn, that a surface quality of the honeycomb body and of the structures of the channels themselves can be precalculable in a locally exactly defined manner and can then be implemented. Desired materials can thereby also be applied in the predeterminable thickness exactly at the calculated location.

The method for producing the honeycomb body and the nature of the honeycomb body itself make it possible to implement intercalations and flow-influencing structures of any kind, particularly in honeycomb bodies composed completely of ceramic. A honeycomb body of this type is suitable, for example, for use in exhaust pipes, for example as an adsorber or catalytic converter, preferably for internal combustion engines of motor vehicles.

The invention claimed is:

1. A honeycomb body, comprising:
ceramic walls all being entirely formed of printed layers forming channels through which a fluid can flow, said channels lying next to one another; said channels configured to conduct the flow of the fluid through said channels in a flow direction; all of said layers being parallel to said flow direction; said walls being formed of a multiplicity of layers built up from ceramic material; said walls having a desired continuous shape; and at least one of at least one measuring sensor or electrically conductive mass forming a monolithic, unitary structure merged and unified into a whole with one of said ceramic walls, wherein said at least one of at least one said measuring sensor or electrically conductive mass directly contacts said ceramic walls.

2. The honeycomb body according to claim 1, wherein said measuring sensor or electrically conductive mass is a positive temperature coefficient material.

3. The honeycomb body according to claim 1, wherein said measuring sensor or electrically conductive mass is a ceramic element.

4. The honeycomb body according to claim 1, wherein said measuring sensor or electrically conductive mass is a thermistor.

5. The honeycomb body according to claim 1, wherein said measuring sensor or electrically conductive mass is a metal disposed in said walls.

6. The honeycomb body according to claim 5, wherein said metal is disposed in an inner or central part of the honeycomb body and leads radially outwardly along a path to a connecting point at an outer part or casing of the honeycomb body.

7. The honeycomb body according to claim 5, wherein said metal is disposed in only at an inlet or outlet side of the honeycomb body.

8. The honeycomb body according to claim 5, wherein said metal is disposed only in walls bordering or near several of said channels.

9. The honeycomb body according to claim 5, wherein said metal is disposed only in walls bordering or near less than 10% of said channels.

10. The honeycomb body according to claim 1, wherein at least one of said measuring sensor and said electrically conductive mass is surrounded completely by ceramic.

11. The honeycomb body according to claim 1, wherein said measuring sensor is a temperature sensor.

12. The honeycomb body according to claim 1, wherein the honeycomb body is formed completely of ceramic.

13. The honeycomb body according to claim 1, wherein said layers are all flat.

14. The honeycomb body according to claim 1, wherein the fluid can flow through said channels in a flow direction, and all of said layers are perpendicular to said flow direction.

15. The honeycomb body according to claim 1, wherein said layers are a multiplicity of interconnected layers disposed one on top of the other.

16. A honeycomb body, comprising ceramic walls all being entirely formed of printed sensor material layers forming channels through which a fluid can flow; said channels lying next to one another in a monolithic, unitary structure merged and unified into a whole; said walls being formed of a multiplicity of layers built up from said sensor material, said sensor material forming at least one of at least one measuring sensor or electrically conductive mass directly contacting said ceramic walls; and said walls having a desired continuous shape.

17. The honeycomb body according to claim 16, wherein said sensor material includes a positive temperature coefficient material.

18. The honeycomb body according to claim 16, wherein said sensor material includes a ceramic element.

19. The honeycomb body according to claim 16, wherein said sensor material includes a thermistor.

20. The honeycomb body according to claim 16, wherein said sensor material includes a metal.

21. A method for producing a honeycomb body, the method comprising the following steps:
providing ceramic walls all being entirely formed of printed layers forming channels through which a fluid can flow, the channels lying next to one another; forming the walls of a multiplicity of layers built up from ceramic material; forming the walls with a desired continuous shape; and incorporating at least one of at least one measuring sensor or electrically conductive mass into one of the ceramic walls forming a monolithic, unitary structure merged and unified into a whole, the at least one of at least one said measuring sensor or electrically conductive mass directly contacts the ceramic walls.

22. The method according to claim 21, wherein the measuring sensor or electrically conductive mass is a positive temperature coefficient material.

23. The method according to claim 21, wherein the measuring sensor or electrically conductive mass is a ceramic element.

24. The method according to claim 21, wherein the measuring sensor or electrically conductive mass is a thermistor.

25. The method according to claim 21, wherein the measuring sensor or electrically conductive mass is a metal disposed in the walls.

26. The method according to claim 25, which further comprises placing the metal in an inner or central part of the honeycomb body and leading the metal radially outwardly along a path to a connecting point at an outer part or casing of the honeycomb body.

27. The method according to claim 25, which further comprises placing the metal only at an inlet or outlet side of the honeycomb body.

28. The method according to claim 25, which further comprises placing the metal only in walls bordering or near several of the channels.

29. The method according to claim 25, which further comprises placing the metal only in walls bordering or near less than 10% of the channels.

30. The method according to claim 21, which further comprises surrounding the at least one measuring sensor or electrically conductive mass completely by ceramic.

31. The method according to claim 21, wherein the measuring sensor is a temperature sensor.

32. The method according to claim 21, wherein the honeycomb body is formed completely of ceramic.

33. The method according to claim 21, wherein the layers are all flat.

34. The method according to claim 21, wherein the fluid can flow through the channels in a flow direction, and all of the layers are perpendicular to the flow direction.

35. The method according to claim 21, wherein the fluid can flow through the channels in a flow direction, and all of the layers are parallel to the flow direction.

36. The method according to claim 21, wherein the layers are a multiplicity of interconnected layers disposed one on top of the other.

37. The method according to claim 21, which further comprises partially interrupting one of the walls to produce an orifice as a passage for the fluid from one of the channels to another.

38. A method for producing a honeycomb body, the method comprising the following steps:
providing ceramic walls all being entirely formed of printed sensor material layers forming channels through which a fluid can flow, the channels lying next to one another in a monolithic, unitary structure merged and unified into a whole; forming the walls of a multiplicity of layers built up from the sensor material, the sensor material forming at least one of at least one measuring sensor or electrically conductive mass directly contacting the ceramic walls; and forming the walls into a desired continuous shape.

39. The method according to claim 38, wherein the sensor material includes a positive temperature coefficient material.

40. The method according to claim 38, wherein the sensor material includes a ceramic element.

41. The method according to claim 38, wherein the sensor material includes a thermistor.

42. The method according to claim 38, wherein the sensor material includes a metal.

* * * * *